(12) United States Patent
Fuhse

(10) Patent No.: US 9,789,726 B2
(45) Date of Patent: Oct. 17, 2017

(54) OPTICALLY VARIABLE AREAL PATTERN

(71) Applicant: GIESECKE & DEVRIENT GMBH, Munich (DE)

(72) Inventor: Christian Fuhse, Otterfing (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 14/436,575

(22) PCT Filed: Oct. 18, 2013

(86) PCT No.: PCT/EP2013/003152
§ 371 (c)(1),
(2) Date: Apr. 17, 2015

(87) PCT Pub. No.: WO2014/060115
PCT Pub. Date: Apr. 24, 2014

(65) Prior Publication Data
US 2016/0170219 A1 Jun. 16, 2016

(30) Foreign Application Priority Data

Oct. 19, 2012 (DE) .................... 10 2012 020 550

(51) Int. Cl.
*B42D 25/328* (2014.01)
*B42D 25/324* (2014.01)
(Continued)

(52) U.S. Cl.
CPC ........... *B42D 25/391* (2014.10); *B42D 25/29* (2014.10); *B42D 25/324* (2014.10);
(Continued)

(58) Field of Classification Search
CPC ............................ B42D 25/328; B42D 25/324
See application file for complete search history.

(56) References Cited

U.S. PATENT DOCUMENTS 7,215,450 B2 * 5/2007 Schilling ................ B42D 25/00
283/86
7,517,578 B2 4/2009 Raksha et al.
(Continued)

FOREIGN PATENT DOCUMENTS

CA 2774819 A1 4/2011
CH WO 2012123303 A1 * 9/2012 ............. B42D 25/29
(Continued)

OTHER PUBLICATIONS

International Search Report for corresponding International PCT Application No. PCT/EP2013/003152, dated Jan. 17, 2014.
(Continued)

*Primary Examiner* — Kyle Grabowski
(74) *Attorney, Agent, or Firm* — Workman Nydegger

(57) ABSTRACT

An optically variable areal pattern has a reflection layer and a micromirror arrangement comprising a plurality of semi-transparent micromirrors developed on the reflection layer. The micromirrors are inclined with respect to the reflection layer, such that, by specular reflection, light incident on the micromirror arrangement is reflected on the semitransparent micromirrors. The incident light is reflected partly in a first direction and partly in a second direction that is different from the first direction, in that it passes through the semitransparent micromirrors, impinges on the reflection layer, and is reflected there and, thereafter, again passes through the semitransparent micromirrors.

20 Claims, 3 Drawing Sheets

(51) Int. Cl.
*B42D 25/391* (2014.01)
*G02B 27/12* (2006.01)
*B42D 25/29* (2014.01)
*G02B 17/00* (2006.01)
*G02B 17/08* (2006.01)
*G02B 27/14* (2006.01)

(52) U.S. Cl.
CPC ......... *B42D 25/328* (2014.10); *G02B 17/002* (2013.01); *G02B 17/0856* (2013.01); *G02B 27/126* (2013.01); *G02B 27/143* (2013.01); *B42D 2033/10* (2013.01); *B42D 2033/18* (2013.01); *B42D 2033/24* (2013.01); *B42D 2033/26* (2013.01)

(56) References Cited

U.S. PATENT DOCUMENTS

| | | | |
|---|---|---|---|
| 8,557,369 B2 | 10/2013 | Hoffmuller et al. | |
| 9,007,669 B2 * | 4/2015 | Heim | B42D 25/29 283/86 |
| 2005/0168723 A1 | 8/2005 | Schilling et al. | |
| 2008/0258456 A1 * | 10/2008 | Rahm | B42D 25/29 283/85 |
| 2008/0259456 A1 * | 10/2008 | Schilling | B42D 25/29 359/571 |
| 2010/0109317 A1 | 5/2010 | Hoffmuller et al. | |
| 2011/0012337 A1 * | 1/2011 | Heim | B42D 25/00 283/94 |

FOREIGN PATENT DOCUMENTS

| | | | |
|---|---|---|---|
| CN | 102574413 A | 7/2012 | |
| DE | 102008046128 A1 | 3/2010 | |
| GB | 2454752 A * | 5/2009 | ............ B42D 25/29 |
| WO | 2004003668 A1 | 1/2004 | |
| WO | 2008098753 A1 | 8/2008 | |

OTHER PUBLICATIONS

Leech et al., "Optically Variable Micro-Mirror Arrays Fabricated by Graytone Lithography," Microelectronic Engineering Feb. 1, 2006, pp. 351-356, vol. 83, No. 2, Elsevier Publishers BV.
Chinese Search Report from corresponding CN Application No. 2013800598127, dated Jan. 13, 2016.

* cited by examiner

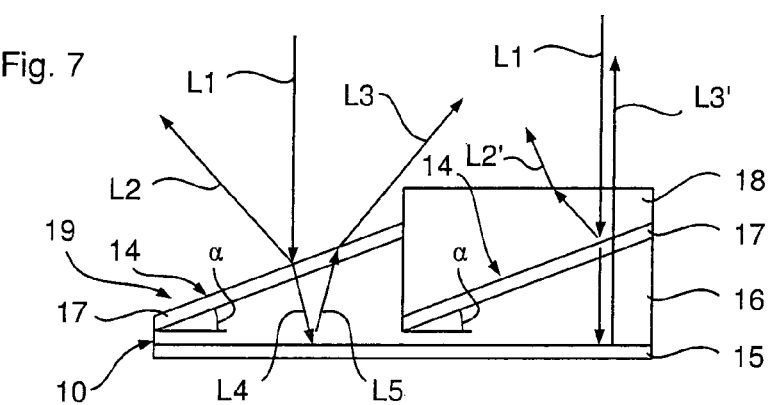
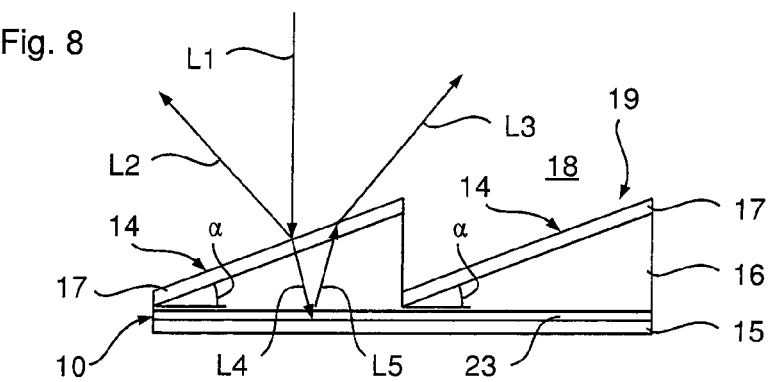

OPTICALLY VARIABLE AREAL PATTERN

BACKGROUND

The present invention relates to an optically variable areal pattern and a value document having such an optically variable areal pattern.

Objects to be protected are frequently furnished with an optically variable areal pattern that permits the authenticity of the object to be verified, and simultaneously serves as protection against unauthorized reproduction.

Diffractive relief patterns (holograms) and relief patterns behaving according to ray optics (micromirrors or microprisms) are known.

Through diffraction, diffractive relief patterns produce colors, with the entire color spectrum normally being run through when tilted, or through color mixing, for example for matte patterns, a white color impression being produced.

Relief patterns behaving according to ray optics, on their own, initially deliver colorless depictions. By providing an additional color coating (for example a color-shift coating), colors or also a color change can be produced. Such coatings normally provide, among other things, at a certain viewing angle or glancing angle of the micromirrors, only one color, or a set color change defined by the coating.

SUMMARY

Proceeding from this, it is the object of the present invention to provide an optically variable areal pattern with which different optical effects can be realized.

According to the present invention, the object is solved by an optically variable areal pattern that comprises a reflection layer and, developed on the reflection layer, a micromirror arrangement that comprises a plurality of semitransparent micromirrors, the micromirrors being inclined with respect to the reflection layer such that, by specular reflection, light incident on the micromirror arrangement is reflected on the semitransparent micromirrors, partly in a first direction and partly in a second direction that is different from the first direction, in that it passes through the semitransparent micromirrors, impinges on the reflection layer, is reflected there and, thereafter, in turn passes through the semitransparent micromirrors.

In this way, the optically variable areal pattern according to the present invention provides two reflected light beams that are reflected in different directions, and with which color effects and/or movement effects can be realized.

In the optically variable areal pattern according to the present invention, a transparent or semitransparent layer can be developed on the reflection layer, the side of the transparent or semitransparent layer facing away from the reflection layer being patterned in a predetermined region to develop the micromirrors. In particular, a semi-reflective coating can be developed in the predetermined region. The semi-reflective coating can also be referred to as a reflection-increasing coating.

The pattern and/or the semi-reflective coating can especially be developed such that a relief pattern (substantially) behaving according to ray optics (and no diffraction pattern) is present that effects the reflection of the incident light in the first direction.

A reflection-increasing coating within the meaning of the present invention is especially a coating that increases the reflection factor for example only from about 20% to about 50%, such as semitransparent layers. The reflection-increasing coating can be a metallic coating that, for example, is vapor deposited. Especially aluminum, gold, silver, copper, palladium, chrome, nickel and/or tungsten and their alloys can be used as the coating material. Alternatively, the reflection-increasing coating can be formed by a coating having a material having a high refractive index. The semi-reflective coating and/or the reflection layer can be present in the form of patterns, characters or codes, and/or comprise gaps in the form of patterns, characters or codes.

The semi-reflective coating can be a color-shifting layer that is developed, for example, as a thin-film system or thin-film interference coating. This can be realized, for example, through a high-index layer of suitable thickness (the thickness is preferably set such that the desired color is created by interference of the light beams reflected on the upper and lower interface), a layer sequence metal layer-dielectric layer-metal layer, or a layer sequence composed of at least three dielectric layers, the refractive index of the middle layer being lower than the refractive index of the two other layers. The color-shifting layer can also be developed as an interference filter, thin semitransparent metal layer having selective transmission through plasma resonance effects, nanoparticles, etc. The color-shifting layer can especially also be realized as a liquid crystal layer, diffractive relief pattern or subwavelength grating.

The micromirrors or the semi-reflective surfaces of the micromirrors that effect the reflection of the incident light in the first direction are preferably developed to be flat. The flat development of the semi-reflective surfaces is, of course, not to be understood in the mathematically precise sense, since, in practice, due to the manufacturing process, it is normally never possible to manufacture perfectly flat areal sections. The flat development is thus preferably to be understood in such a way that it is flat insofar as it is possible in terms of manufacturing technology. Alternatively, it is possible to develop the semi-reflective surfaces of the micromirrors to be curved (for example concave, convex or wavy). However, the curvature of the semi-reflective surfaces of the micromirrors is preferably small.

The semitransparent layer can be developed, for example, as a colored layer or as an ink layer. In this way, the color of the light reflected in the second direction can be influenced or set.

The transparent or semitransparent layer can be a lacquer layer and especially an embossing lacquer layer.

Further, the pattern of the transparent or semitransparent layer can formed by embossing.

Furthermore, a semitransparent ink layer can be arranged between the reflection layer and the transparent or semitransparent layer. The color of the light reflected in the second direction can be influenced or set with the semitransparent ink layer.

The transparent or semitransparent layer and/or the semi-reflective coating can have, at least in a portion of the visible spectrum, a refractive index of at least 1.6 and preferably of at least 1.8.

Further, the micromirrors can be embedded in a medium that has, at least in a portion of the visible spectrum, a refractive index that deviates from the refractive index of the transparent or semitransparent layer and/or of the semi-reflective coating by at least 0.1, preferably by at least 0.2 and particularly preferably by at least 0.4. Said embedding layer can be a component of the optically variable areal pattern. However, it is also possible that it is the adjacent medium (for example air).

In the case of the optically variable areal pattern, the reflection layer and the micromirror arrangement can be developed in such a way that the light reflected in the first and second direction is of different colors.

Further, the semitransparent micromirrors can form a sawtooth-shaped profile. The arrangement of the micromirrors can be regular or also irregular.

In particular, the side of the reflection layer facing the semitransparent micromirrors and/or the side of the reflection layer facing away from the micromirrors can be developed to be flat.

In the case of the optically variable areal pattern according to the present invention, multiple of the micromirrors can be arranged next to one another in an arrangement direction, and their dimension in the arrangement direction can be in the range from 2 µm to 3 mm, preferably from 3 µm to 100 µm and particularly preferably from 5 µm to 30 µm.

The optically variable areal pattern can be developed such that, for light incident parallel to the macroscopic surface normal of the areal pattern, the first and second direction of the reflected light are on different sides of the macroscopic surface normal. However, it is also possible that the first and second direction of the reflected light are on the same side of the macroscopic surface normal.

The semi-reflective coating can comprise one or more (especially high-index) dielectric layer or layers, a semitransparent metallic layer, a layer composed of semiconducting material and/or a liquid crystal layer.

Further, the color generation at the reflection layer and/or at the surface of the micromirrors can be realized through subwavelength patterns, especially subwavelength gratings.

The reflection layer can comprise one or more metallic layers, a thin-film color-shift layer (especially having the structure absorber/dielectric/reflector or the structure absorber/dielectric/reflector/dielectric/absorber), one or more (especially high-index) dielectric layers and/or a liquid crystal layer.

As the dielectric material for the semi-reflective coating and the reflection layer, for example ZnS, $SiO_2$, $TiO_2$, $MgF_2$ can be used.

The optically variable areal pattern according to the present invention can be developed in such a way that very different movement effects are realized with the light beams reflected in the first direction (or the light beams reflected in the second direction), for example when the areal pattern is tilted. In this way, the "rolling bar" effect mentioned in U.S. Pat. No. 7,517,578 B2, for example, can be realized. According to the present invention, there then likewise results, due to the light beams reflected in the second direction (or in the first direction), a (corresponding) movement effect that can have the identical or an opposite movement direction and an identical or different movement speed. Also other movement effects can be realized when the optically variable areal pattern is tilted, such as so-called flip, running or pump effects. The movement here advantageously occurs in the same direction or in opposite directions.

Further, the optically variable areal pattern according to the present invention (including its developments) can be used as a security element, especially as a security element for security papers, value documents or the like.

The security element can especially be developed as a security thread, tear strip, security band, security strip, patch, foil element or as a label for application to a security paper, value document or the like. In particular, the security element can span transparent regions or gaps. Further, in polymer or hybrid banknotes, the security element can be embedded under foil.

Here, the term security paper is especially understood to be the not yet circulatable precursor to a value document, which precursor can comprise, in addition to the security element according to the present invention, for example also further authenticity features (such as luminescent substances provided in the volume). Here, on the one hand, value documents are understood to be documents manufactured from security papers. On the other hand, value documents can also be other documents and objects that can be provided with the security element according to the present invention so that the value documents comprise non-copyable authenticity features, making an authenticity verification possible and simultaneously preventing undesired copying.

Further, a value document having an inventive optically variable areal pattern (including its developments) is provided.

It is understood that the above-mentioned features and those yet to be explained below are usable not only in the specified combinations, but also in other combinations or alone, without departing from the scope of the present invention.

BRIEF DESCRIPTION OF THE DRAWINGS

By way of example, the present invention will be explained in greater detail below by reference to the attached drawings, which disclose also features that are essential to the invention. To improve clarity, a depiction to scale and proportion was, in some cases, dispensed with in the drawings. Shown are:

FIG. 7 a magnified sectional view of two micromirrors 14 of a further embodiment of the optically variable areal pattern according to the present invention, and FIG. 8 a magnified sectional view of two micromirrors 14 of a further embodiment of the optically variable areal pattern 10 according to the present invention.

DETAILED DESCRIPTION OF VARIOUS EMBODIMENTS

Figure 1:
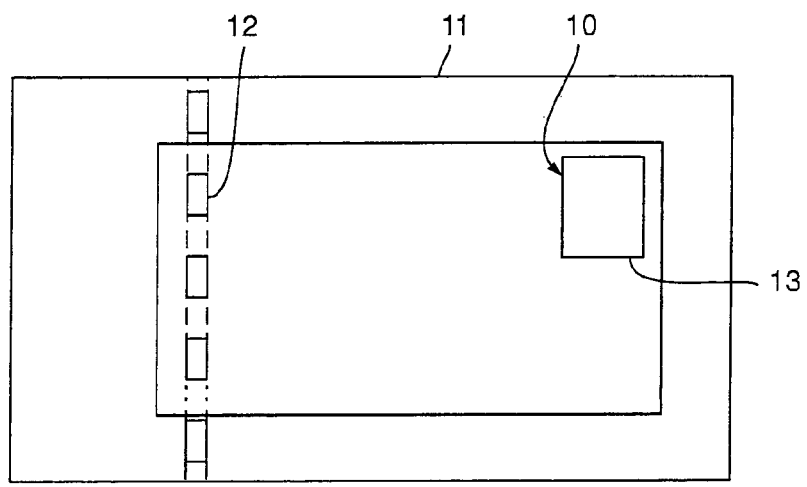
FIG. 1 a top view of a banknote 11 having an optically variable areal element 10 according to the present invention.

In the embodiment shown in FIG. 1, the optically variable areal pattern 10 according to the present invention is integrated as a security element in a banknote 11 in such a way that it is visible in the front of the banknote 11 shown in FIG. 1. Alternatively, the optically variable areal element 10 according to the present invention can be present, for example, as a window thread 12.

Figure 2:
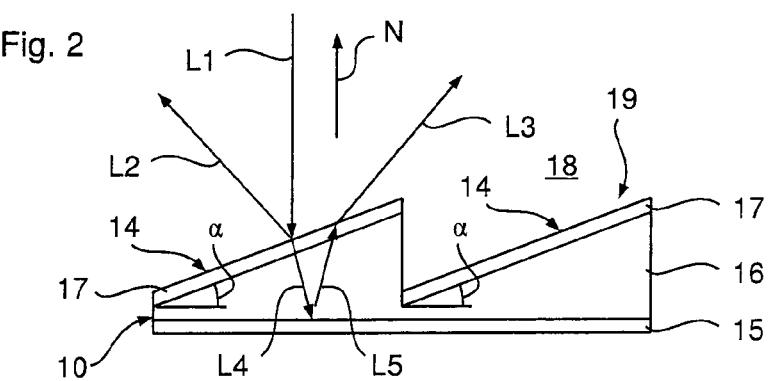
FIG. 2 a magnified sectional view of two micromirrors of the optically variable areal element in FIG. 1.

In the embodiment described here, the optically variable element 10 comprises a rectangular areal region 13 having a plurality of micromirrors 14 that are formed on a reflection layer 15, as is apparent especially in the magnified sectional view of two micromirrors 14 in FIG. 2.

The micromirrors 14 are formed by an embossing lacquer layer 16 whose side facing away from the reflection layer 15 is patterned (here with a sawtooth profile), and a coating 17 that is provided on the patterned side of the embossing lacquer layer 16. As is apparent from the diagram in FIG. 2, the micromirrors 14 are inclined with respect to the reflection layer 15 (angle α).

The coating 17 can, but need not, be provided. In particular, the coating 17 is developed as a semi-reflective coating that specularly reflects a portion of an incident light beam L1 and thus produces a first reflected light beam L2, and that transmits another portion of the incident light beam L1.

The transmitted portion passes through the embossing lacquer layer 16 (light beam L4), impinges on the reflection layer 15 and is reflected (light beam L5) by said reflection layer, passes in turn through the embossing lacquer layer 16 and the coating 17 and exits as the second reflected light beam L3. The refraction occurring at the interfaces between the different media is marked only schematically in FIG. 2. A refraction occurs at the transition between the surroundings and the coating 17, as well as at the interface between the coating 17 and the embossing lacquer layer 16. Furthermore, multiple reflections are not taken into account, which can occur due to a renewed reflection of the light beam L5 to the reflection layer 15.

As is apparent from the diagram according to FIG. 2, with the optically variable areal pattern 10 according to the present invention, an incident light beam L1 is specularly reflected on the coating 17 or on the micromirror 14 in a first direction (first reflected light beam L2) and, by refraction, on the interface between the surroundings and the coating 17, on the one hand, and the interface between the coating 17 and the embossing lacquer layer 16 on the other hand, and reflection on the reflection layer 15 in a second direction (second reflected light beam L3), the two directions differing.

Here, the brightness and color of the first reflected light beam L2 can be dictated by the optical properties of the coating 17. The brightness and color of the second reflected light beam L3 can be dictated, for example, by the optical properties of the reflection layer 15. Furthermore, it is possible to develop the embossing lacquer layer 16 to be colored, which influences the color and brightness of the second reflected light beam L2.

It is thus possible to set the color of the two reflected light beams L2 and L3 differently, such that, at a certain viewing angle, upon viewing the optically variable areal pattern 10, a viewer can perceive the color of the first reflected light beam L2, and at a second angle, can perceive the color of the second reflected light beam L3. A color-flip effect is thus provided for the viewer.

The different colors can become visible, for example, at a relatively low slope of the micromirrors 14 at viewing angles lying very close to one another. In this way, very discrete, that is, fast and clear, color changes are possible that stand out considerably from the continuous and rather slow color changes, for example in a thin-film color-shift coating having an absorber/dielectric/reflector.

The coating 17 can also be referred to as a reflection-increasing coating, as it increases the reflection factor of the micromirrors 14 compared with the case without coating 17.

The side of the reflection layer 15 facing the micromirrors 14 is preferably developed to be flat. Furthermore, the reflection layer 15 can be developed, for example, as a metallic coating (for example Ag, Al, Cu, etc.) or as a color-shifting coating, especially as a thin-film system. The thin-film system can comprise, for example, an absorber/dielectric/reflector structure.

The pattern of the side of the embossing lacquer layer 16 facing away from the reflection layer 5 is preferably produced by an embossing process. The patterned embossing lacquer layer 16 (together with the optionally provided coating 17) thus simultaneously serves, according to the present invention, as a mirror (for the first reflected light beam L2) and as a prism (for the second reflected light beam L3).

The material of the embossing lacquer layer 16 and/or of the coating 17 is chosen such that the refractive index of said material differs from the refractive index of the medium 18 (here for example air) adjacent to the embossing lacquer layer 16 or the coating 17. In particular, the refractive index of the embossing lacquer layer 16 or of the coating 17 is greater than that of the medium 18. Also a protective lacquer layer (not shown), for example, can be provided as the medium 18.

In particular, the refractive indices of the embossing lacquer layer 16 or of the coating 17 and of the medium 18 can be chosen such that, for vertically incident light L1 (with respect to the reflection layer 15), the two reflected light beams L2 and L3 are reflected on the same side of the macroscopic normal N of the optically variable areal pattern 10 (FIG. 2), but at different angles. In this way, it is possible to produce, for example, two-colored running effects that do not run oppositely but in the same direction, but at different speeds. Thus, it is possible to produce, for example, a "rolling bar" in which two different-colored bars run in the same direction at different speeds.

In the case of the optically variable areal pattern 10 according to the present invention, the micromirrors 14 thus form a micromirror array or a micromirror arrangement 19 that executes the specular reflection of the first reflected light beam L2 and enables the reflection of the transmitted portion of the incident light beam L1 on the reflection layer 15 such that the second reflected light beam L3 is produced.

Figure 3:
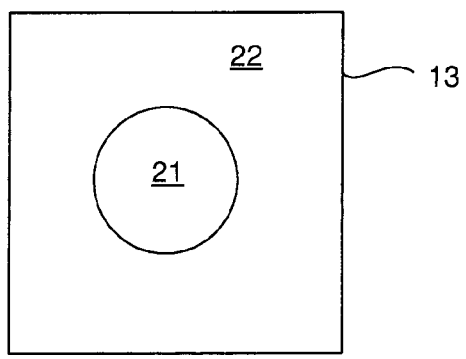
FIG. 3 a top view of a further embodiment of a rectangular areal region 13 of the optically variable element 10 according to the present invention.
Figure 4:
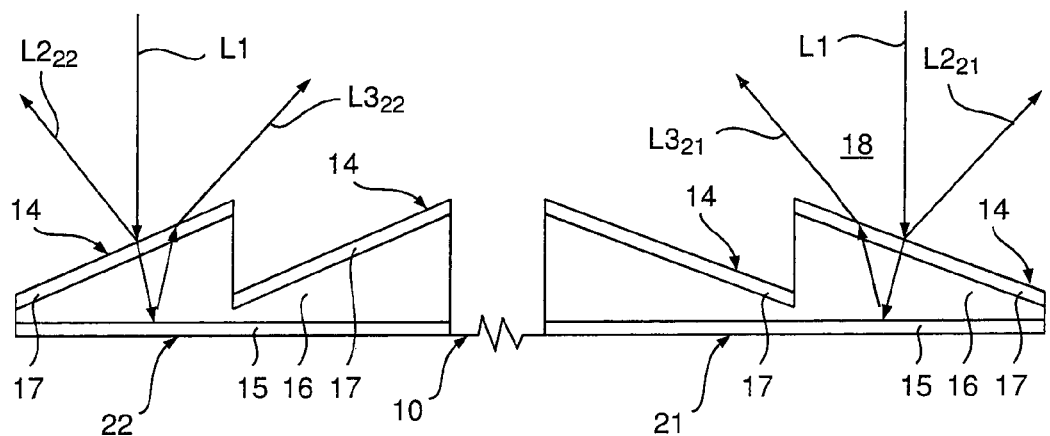
FIG. 4 a magnified sectional view of each of two micromirrors 14 from the two regions 21 and 22 according to FIG. 3.

The optically variable areal pattern 10 can comprise, for example, a first and a second region 21, 22, as is indicated in a schematic top view in FIG. 3, in which the inclines (angle α) of the micromirrors 14 of the micromirror array 19 differ. In particular, the inclines can be chosen such that the direction of the first reflected light beam L$2_{21}$ from the first region 21 coincides with the direction of the second reflected light beam L$3_{22}$ from the second region 22, the colors of said two light beams, however, differing. A corresponding sectional view of the micromirrors 14 from the regions 21 and 22 is shown in FIG. 4. The two colors are thus visible for the viewer at the same viewing angle. Said colors can thus be presented to the viewer in extremely high resolution and positioned next to each other in perfect register. Here, the second reflected light beam L$3_{21}$ from the first region 21 and the first reflected light beam L$2_{22}$ from the second region have different directions.

In a further development, with the optically variable areal pattern according to the present invention, the so-called "rolling bar" effect can be produced. For this, the reflection layer 15 can be developed, for example, as a color-shift coating, and the coating 17 as a layer having a high refractive index, such that, for appropriately chosen layer thicknesses, the first reflected light beam L2 appears green, and the second reflected light beam L3 appears magenta. In the diagrams in FIG. 5A-5C, the magenta-colored bar B1 is hatched horizontally and the green bar B2 is hatched vertically. In an initial position, the two bars B1, B2 overlap in the middle of the optically variable areal pattern 10, no exact overlap being marked in FIG. 5B, which shows this initial position, for clarity. For example, upon tilting in a first direction, the magenta-colored bar B1 can wander upward and the green bar B2 downward, as is indicated in FIG. 5C by the marked arrows P1 and P2. Upon tilting in the opposite direction, the two bars wander in the respective other direction, that is, the magenta-colored bar B1 downward and the green bar B2 upward (FIG. 5A), the movement directions in turn being indicated by the arrows P1 and P2.

Figure 5A:
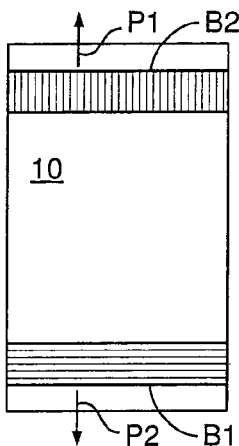
FIGS. 5A-5C diagrams to explain the "rolling bar" effect.
Figure 5B:
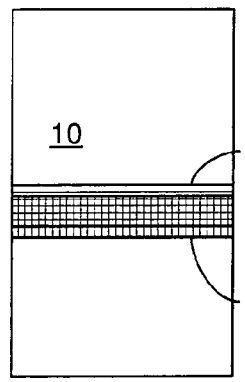
Figure 5C:
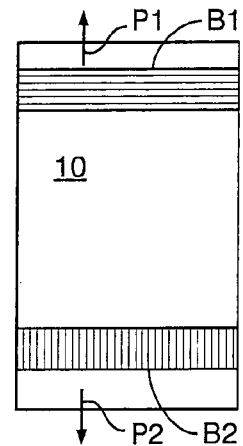
Figure 6:
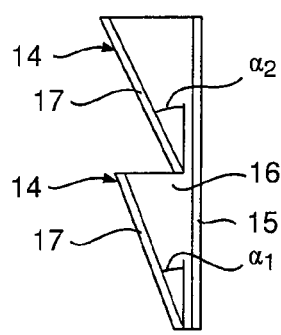
FIG. 6 a magnified sectional view of two micromirrors 14 to explain the "rolling bar" effect described in connection with FIGS. 5A-5C.

To achieve this movement effect, the incline α of the micromirrors 14, for example, can be varied in the desired movement direction, as is depicted schematically in the sectional view in FIG. 6, which shows a cut in the direction of the arrow P1 according to FIG. 5A of two adjacent micromirrors 14. The marked incline angles $α_1$ and $α_2$ differ, the incline angle α here increasing from bottom to top.

The described "rolling bar" effect is an example of a two-colored overlapping running effect that can be realized with the optical areal pattern according to the present invention. Of course also other running effects are realizable. For instance, especially so-called flip, running and/or pump effects that can move in the same or opposite directions can be realized when the optically variable areal pattern is tilted.

Further, also a pump effect in which the contours of a symbol or a value number "pump" inward or outward can be realized. Here, repeating pump effects having many simultaneously visible contour lines that can then light up very delicately in different colors at the right viewing angle are particularly attractive.

The micromirror array 14 can, in some regions, be embedded in a medium 18 that has a similar refractive index as the embossing lacquer layer 16 or the coating 17, as is depicted in FIG. 7. In this way, the refraction on the top of the relief pattern is cancelled locally, causing the directions of the first and second reflected light beam L2' and L3' from regions having the medium 18 to differ from the directions of the first and second light beam L2, L3 from regions without the medium 18. This is grounded particularly in the fact that the medium 18 cancels the refraction effects for the second reflected light beam L3' and adds refraction effects for the first reflected light beam L2'. As is apparent in detail in FIG. 7, in the region having the medium 18, the first reflected light beam L2' is refracted also on the top of the layer 18 and thus generally runs in another direction than the first light beam L2 from the region without the coating 18. The second light beam L3' from the region having the coating 18 is always visible in the mirror reflection of the reflection layer 15 and thus runs in another direction than the second light beam L3 from the region without the coating 18.

Further, the optically variable areal pattern 10 can be developed such that, for example, the first reflected light beam L2 is green, and the refracted and down-reflected second light beam L3 is magenta. If one then chooses the slopes of the micromirrors 14 in such a way that they are identical in the regions 21 and 22 according to FIG. 3, and provides the refraction-canceling coating 18 on the top of the optically variable areal pattern 10 in the region 22, one achieves the following optical effects. The region 22 is brightly visible at two different first angles. Due to the light beams L2', it is visible in green, and due to the light beams L3', in magenta. The region 21 is visible at two further angles in green (due to the light beams L2) and in magenta (light beams L3). Since the coating 18 has a similar or, ideally, identical refractive index as the coating 17, the further distinctive feature is present here that the reflection direction of the second light beam L3' always corresponds to a mirror reflection on the reflection layer 15 (independently of the incline α of the micromirrors 14). The region 22 thus lights up in the mirror reflection of the reflection layer 15, that is, always as a homogeneous magenta-colored region, also if the micromirrors 14 have, for example, a varying orientation in this region.

To develop the micromirrors 14, the pattern of the side of the embossing lacquer layer 16 facing away from the reflection layer 15 can be regular or irregular. In particular, periodic or aperiodic sawtooth patterns are possible.

For example, no coating 17 can be provided on the embossing lacquer layer 16. In this case, there is an interface between the embossing lacquer layer 16 and the air. The embossing lacquer of the embossing lacquer layer 16 can preferably be a high-index embossing lacquer. Of course the layer 16 need not be an embossing lacquer layer, but rather can also be any other transparent or semitransparent layer having a patterned top or having a relief pattern on the top.

The coating 17 can be a dielectric coating, especially a high-index coating or a low-index coating on a high-index embossing lacquer 16. Also a multilayer thin-film system (metal/dielectric/metal) or also a purely dielectric multilayer system is possible. Furthermore, the coating 17 can be developed as a liquid crystal layer. An embodiment of the surface of the micromirrors 14 having chromophoric embossing patterns and/or nanopatterns is likewise possible (for example semitransparent metalized subwavelength patterns, especially subwavelength gratings).

The reflection layer 15 can be developed, for example, as a liquid crystal layer (advantageously against a dark background). It is also possible to provide color-creating nanopatterns (for example subwavelength patterns, especially subwavelength gratings), photonic crystals, thin-film colorshift or a simple metalization (for example Al, Au, Cu, Cr, etc.).

The reflection layer 15 can be partially transmissive, such that the optically variable areal pattern 10 according to the present invention can also have an optically variable effect that is visible from the bottom (due to transmission through the reflection layer 15, reflection on the micromirrors 14 and renewed transmission through the partially transmissive lower reflection layer 15 back to the reverse).

The optically variable areal pattern 10 according to the present invention can especially be developed such that the two reflected light beams L2 and L3 appear to be (especially approximately) identically bright and/or have a different color (especially complementary colors). Thus, for example, the coating 17 can particularly strongly reflect a first color, and simultaneously allow the complementary color, to a high degree, to pass through. The complementary color is then reflected on the reflection layer 15. In this case, especially for the coating 17, dielectric layers, multilayers or liquid crystal layers in which the incident light can be broken down, largely without absorption loss, into reflected and transmitted light are particularly suitable. Furthermore, the optically variable areal pattern 10 can be developed in such a way that one of the two reflected light beams L2, L3 appears to be colorless (white), with white also being referred to as a color within the meaning of the present invention.

To protect against molding of the micromirrors 14, the micromirrors 14 can, for example, be embedded (for instance, the embossing lacquer layer 16 can have a higher refractive index than the layer to be provided for embedding, which can be, for example, a protective lacquer layer).

However, it is also possible that the embedding layer has a higher refractive index than the embossing lacquer layer 16.

Furthermore, a protective foil can be provided that is chosen such that the refractive effect of the micromirrors 14 is preserved and is not, for example, destroyed by a laminating adhesive having a similar refractive index. Thus, the protective foil can, for example, be discretely heat sealed (for example with a laser), affixed, etc. to preserve air or gas bubbles. It is also possible to use a high-index embossing lacquer or, for example, to gap the laminating adhesive for the protective foil in the region of the optically variable areal pattern.

The optically variable areal pattern according to the present invention is preferably produced and/or used on a substrate foil. The substrate foil can especially be arranged under the reflection layer 15, between the reflection layer 15 and the embossing lacquer layer 16 or the micromirrors 14, or also above the micromirrors 14.

The reflection layer 15 and the coating 17 can be gapped in some regions, for example in the same or different, overlapping or non-overlapping regions. Accordingly, the corresponding colors or effects are then visible only in some regions.

The micromirrors 14 can advantageously be embossed in a colored embossing lacquer 16. In this way, it is possible to produce, relatively economically, colors of the refracted, down-reflected second light beam L3. Alternatively, also a separate colored layer 23 (for example lacquer layer) can be provided, for example between the micromirrors 14 composed of transparent embossing lacquer and the reflection layer 15, as is shown in FIG. 8.

The optically variable areal pattern 10 according to the present invention can also be developed as a security thread 12 (FIG. 1). Further, the optically variable areal pattern 10 can not only, as described, be developed on a substrate foil from which it can be transferred to the value document in a known manner. It is also possible to develop the optically variable areal pattern 10 directly on the value document. Thus, a direct print with subsequent embossing of the micromirrors on a polymer substrate can be carried out to develop, for example in plastic banknotes, an optically variable areal pattern according to the present invention. The optically variable areal pattern according to the present invention can be developed in the most varied substrates. In particular, it can be developed in or on a paper substrate, a paper having synthetic fibers, that is, paper having a portion x of polymer material in the range from 0<x<100 wt. %, a plastic foil, for example a foil composed of polyethylene (PE), polyethylene terephthalate (PET), polybutylene terephthalate (PBT), polyethylene naphthalate (PEN), polypropylene (PP) or polyamide (PA), or a multilayer composite, especially a composite of multiple different foils (composite laminate) or a paper-foil composite (foil/paper/foil or paper/foil/paper), the optically variable areal pattern being able to be provided in or on or between each of the layers of such a multilayer composite.

LIST OF REFERENCE SIGNS

10 Optically variable areal pattern
11 Banknote
12 Window thread
13 Rectangular areal region
14 Micromirror
15 Reflection layer
16 Embossing lacquer layer
17 Coating
18 Medium
19 Micromirror array
21 First region
22 Second region
23 Ink layer
L1 Incident light beam
L2, L2' First reflected light beam
L3, L3' Second reflected light beam
L4, L5 Light beam
N Macroscopic surface normal
P1, P2 Movement direction
B1 Magenta-colored bar
B2 Green bar

The invention claimed is:

1. An optically variable areal pattern comprising:
   a reflection layer; and
   a micromirror arrangement developed on the reflection layer, the micromirror arrangement comprising a plurality of semitransparent micromirrors;
   wherein the semitransparent micromirrors are inclined with respect to the reflection layer, such that, by specular reflection, light incident on the micromirror arrangement is reflected on the semitransparent micromirrors, partly in a first direction and partly in a second direction that is different from the first direction, in that it passes through the semitransparent micromirrors, impinges on the reflection layer, is reflected there and, thereafter, again passes through the semitransparent micromirrors.

2. The optically variable areal pattern according to claim 1, wherein a transparent or semitransparent layer is developed on the reflection layer, the side of the transparent or semitransparent layer facing away from the reflection layer being patterned in a predetermined region to develop the micromirrors.

3. The optically variable areal pattern according to claim 2, wherein to develop the semitransparent micromirrors in the predetermined region, a semi-reflective coating is developed.

4. The optically variable areal pattern according to claim 2, wherein the semitransparent layer is developed as a colored layer.

5. The optically variable areal pattern according to claim 2, wherein the patterning of the transparent or semitransparent layer is formed by embossing.

6. The optically variable areal pattern according to claim 2, wherein a semitransparent ink layer is arranged between the reflection layer and the transparent or semitransparent layer.

7. The optically variable areal pattern according to claim 2, wherein the transparent or semitransparent layer or the semi-reflective coating has, at least in a portion of the visible spectrum, a refractive index of at least 1.6.

8. The optically variable areal pattern according to claim 2, wherein the semitransparent micromirrors are embedded in a medium that has, at least in a portion of the visible spectrum, a refractive index that deviates from the refractive index of the transparent or semitransparent layer or of the semi-reflective coating by at least 0.1.

9. The optically variable areal pattern according to claim 2, wherein subwavelength patterns are developed in the patterned surface of the transparent or semitransparent layer, or in the semi-reflective coating.

10. The optically variable areal pattern according to claim 1, wherein the reflection layer and the micromirror arrangement are developed in such a way that the light reflected in the first and second direction is of different colors.

11. The optically variable areal pattern according to claim 1, wherein the semitransparent micromirrors form a saw-tooth-shaped profile.

12. The optically variable areal pattern according to claim 1, wherein the side of the reflection layer facing the semitransparent micromirrors, and/or the side of the reflection layer facing away from the semitransparent micromirrors are/is developed to be flat.

13. The optically variable areal pattern according to claim 1, wherein several of the semitransparent micromirrors are arranged adjacent to each other in an arrangement direction, and their dimension in the arrangement direction is in the range from 2 µm to 3 mm.

14. The optically variable areal pattern according to claim 1, wherein for vertically incident light, the first and second direction of the reflected light are on different sides of the macroscopic surface normal of the optically variable areal pattern.

15. The optically variable areal pattern according to claim 3, wherein the semi-reflective coating comprises one or more dielectric layers, a semitransparent metallic layer, a layer composed of semiconducting material and/or a liquid crystal layer.

16. The optically variable areal pattern according to claim 1, wherein the reflection layer comprises one or more metallic layers, a thin-film color-shift-layer, one or more dielectric layers and/or a liquid crystal layer.

17. The optically variable areal pattern according to claim 1, wherein subwavelength patterns are developed in the reflection layer.

18. The optically variable areal pattern according to claim 1, wherein the reflection layer and/or the semi-reflective coating is present in the form of patterns, characters or codes, and/or comprises gaps in the form of patterns, characters or codes.

19. A value document having an optically variable areal pattern according to claim 1.

20. An optically variable areal pattern comprising:
a reflection layer; and
a micromirror arrangement developed on the reflection layer, the micromirror arrangement comprising a plurality of semitransparent micromirrors;
wherein the semitransparent micromirrors are inclined with respect to the reflection layer, such that, by specular reflection, light incident on the micromirror arrangement is reflected on the semitransparent micromirrors, partly in a first direction and partly in a second direction that is different from the first direction, in that it passes through the semitransparent micromirrors, impinges on the reflection layer, is reflected there and, thereafter, again passes through the semitransparent micromirrors, and
wherein the micromirror arrangement comprises a transparent or semitransparent layer developed on the reflection layer, the side of the transparent or semitransparent layer facing away from the reflection layer being patterned in a predetermined region to develop the micromirrors, and
wherein the semitransparent micromirrors in the predetermined region further comprise a semi-reflective coating developed on the side of the transparent or semitransparent layer facing away from the reflection layer.

* * * * *